United States Patent
Sinivaara et al.

(10) Patent No.: US 7,817,961 B2
(45) Date of Patent: Oct. 19, 2010

(54) BEACON TRANSMISSION IN SHORT-RANGE WIRELESS COMMUNICATION SYSTEMS

(75) Inventors: Hasse Sinivaara, Espoo (FI); Mika Kasslin, Espoo (FI); Jari Jokela, Ylöjärvi (FI)

(73) Assignee: Nokia Corporation, Espoo (FI)

( * ) Notice: Subject to any disclaimer, the term of this patent is extended or adjusted under 35 U.S.C. 154(b) by 827 days.

(21) Appl. No.: 10/563,953

(22) PCT Filed: Jul. 11, 2003

(86) PCT No.: PCT/FI03/00558

§ 371 (c)(1),
(2), (4) Date: Jan. 10, 2006

(87) PCT Pub. No.: WO2005/006658

PCT Pub. Date: Jan. 20, 2005

(65) Prior Publication Data

US 2006/0193315 A1    Aug. 31, 2006

(51) Int. Cl.
*H04W 4/00* (2009.01)
*H04B 7/00* (2006.01)

(52) U.S. Cl. ............... 455/41.2; 455/550.1; 455/3.01; 455/3.03; 370/338; 370/328; 370/310

(58) Field of Classification Search ............ 370/310, 370/311, 312, 313, 338, 328; 455/41.2, 550.1, 455/3.01, 3.03, 3.04, 3.05
See application file for complete search history.

(56) References Cited

U.S. PATENT DOCUMENTS

| | | | | |
|---|---|---|---|---|
| 5,812,531 | A  * | 9/1998 | Cheung et al. | 370/255 |
| 6,868,256 | B2 * | 3/2005 | Dooley et al. | 455/41.1 |
| 7,274,929 | B1 * | 9/2007 | Banginwar | 455/418 |
| 7,299,007 | B2 * | 11/2007 | Eskin | 455/41.2 |
| 7,639,661 | B2 * | 12/2009 | Iwami et al. | 370/345 |
| 2002/0131371 | A1 * | 9/2002 | Rudnick | 370/252 |
| 2002/0176366 | A1 * | 11/2002 | Ayyagari et al. | 370/245 |
| 2003/0002456 | A1 * | 1/2003 | Soomro et al. | 370/328 |
| 2004/0246932 | A1 * | 12/2004 | Fischer | 370/338 |
| 2004/0253948 | A1 * | 12/2004 | Laberteaux | 455/422.1 |
| 2006/0193296 | A1 * | 8/2006 | Zhong et al. | 370/338 |
| 2007/0110023 | A1 * | 5/2007 | Bennett | 370/350 |

FOREIGN PATENT DOCUMENTS

| | | |
|---|---|---|
| EP | 1206070 A2 | 10/2001 |
| WO | WO 00/35230 | 11/1999 |
| WO | WO 03/047176 | 11/2002 |

* cited by examiner

*Primary Examiner*—Huy Phan
(74) *Attorney, Agent, or Firm*—Banner & Witcoff, Ltd

(57) ABSTRACT

The invention relates to a method for broadcasting beacon frames in a short-range wireless ad-hoc network including a plurality of wireless terminals. In order to improve the efficiency of the ad-hoc network in terms of power consumption, the terminal that defines the beacon interval for the network starts as a beacon broadcaster and introduces an identifier list in at least some of the beacon frames broadcast in the network. The identifier list, which includes identifiers of the wireless terminals belonging to the network, is utilized if another wireless terminal is to be selected as the beacon broadcaster.

8 Claims, 3 Drawing Sheets

FIG. 6

| Order | Information |
|---|---|
| 1 | Timestamp |
| 2 | Beacon interval |
| 3 | Capability |
| 4 | Service Set Identifier (SSID) |
| 5 | Supported rates |
| 6 | Frequency-Hopping Parameter Set |
| 7 | DS Parameter Set |
| 8 | CF Parameter Set |
| 9 | IBSS Parameter Set |
| 10 | Traffic indication map (TIM) |
| 11 | Country |
| 12 | FH Parameters |
| 13 | FH Pattern Table |
| 14 | Terminal Identifier List |

| ELEMENT ID | LENGTH | IDENTIFIER OF TERMINAL 1 | POWER STATE OF TERMINAL 1 | ... | IDENTIFIER OF TERMINAL i | POWER STATE OF TERMINAL i |
|---|---|---|---|---|---|---|
| 1 | 1 | N | 1 | | N | 1 |

*FIG. 9*

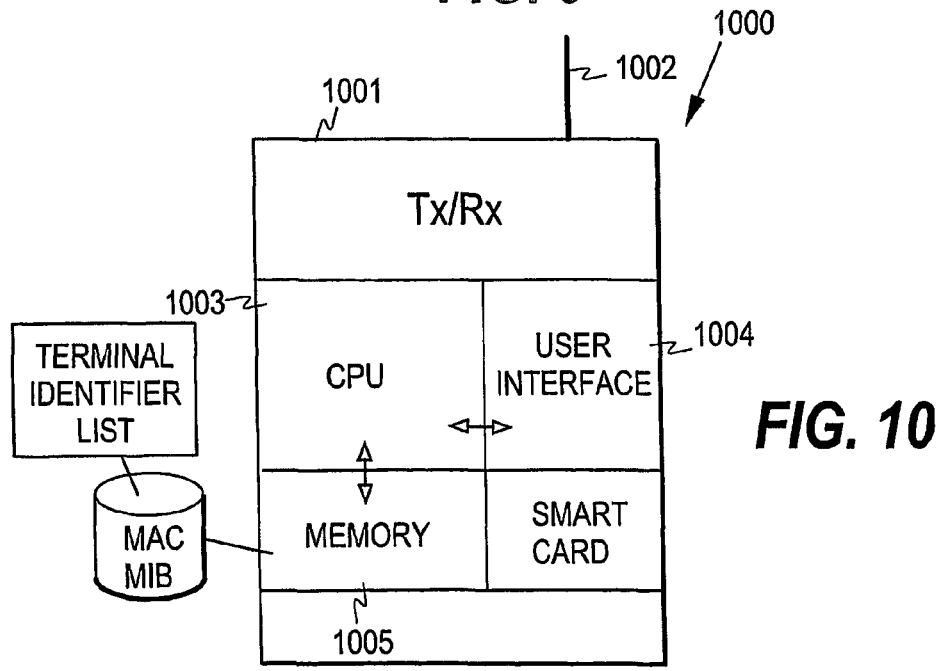

*FIG. 10*

BEACON TRANSMISSION IN SHORT-RANGE WIRELESS COMMUNICATION SYSTEMS

FIELD OF THE INVENTION

The invention relates to short-range wireless communication systems where beacon frames are broadcast.

BACKGROUND OF THE INVENTION

The current development towards truly mobile computing and networking has brought on the evolvement of various access technologies that also provide the users with access to the Internet when they are outside their own home network. At present, wireless Internet access is typically based on either short-range wireless systems or mobile networks, or both.

Short-range wireless systems have a typical range of one hundred meters or less. They often combine with systems wired to the Internet to provide communication over long distances. The category of short-range wireless systems includes wireless personal area networks (PANs) and wireless local area networks (WLANs). They have the common feature of operating in unlicensed portions of the radio spectrum, usually either in the 2.4 GHz Industrial, Scientific, and Medical (ISM) band or in the 5 GHz unlicensed band.

Wireless personal area networks use low cost, low power wireless devices that have a typical range of about ten meters. The best-known example of wireless personal area network technology is Bluetooth, which uses the 2.4 GHz ISM band. It provides a peak air link speed of one Mbps, and power consumption low enough for use in personal, portable electronics such as PDAs and mobile phones. Wireless local area networks generally operate at higher peak speeds of 10 to 100 Mbps and have a longer range, which requires greater power consumption.

Wireless LAN systems are typically extensions of a wired network, providing mobile users with wireless access to the wired network. Examples of wireless local area network technology include the IEEE 802.11a, which is designed for the 5 GHz unlicensed band, and uses orthogonal frequency division multiplexing (OFDM) to deliver up to 54 Mbps data rates; the 802.11b, which is designed for the 2.4 GHz ISM band and uses direct sequence spread spectrum (DSSS) to deliver up to 11 Mbps data rates; and the HIPERLAN Standard, which is designed to operate in the 5 GHz unlicensed band.

In wireless LAN technology, two basic network topologies are available for network configuration: an ad-hoc network and an infrastructure network. An ad-hoc network is formed by two or more independent mobile terminals without the services of a base station, i.e. in an ad-hoc network the terminals communicate on a peer-to-peer basis. An ad-hoc network is normally formed for temporary purposes. The infrastructure network, in turn, comprises one or more wireless base stations, called access points, which form part of the wired infrastructure. In a typical network of this type, all traffic goes through the access points, regardless of whether the traffic is between two terminals or a terminal and the wired network, i.e. the mobile terminals do not communicate on a peer-to-peer basis. The mobile terminals are provided with wireless LAN cards, whereby they can access the wired network or set up an ad-hoc network. In an infrastructure network an access point and at least one terminal is said to form a Basic Serving Set (BSS), while an ad-hoc network is also termed an Independent BSS (IBSS).

So far, WLAN technology has been used mainly in laptop computers, which are typically AC powered but which may also be used in battery mode that provides a fairly high battery capacity. To prolong the life of the batteries, the WLAN standards define a specific power save mode into which the terminals may enter in order to decrease their power consumption. In this mode the power consumption is very low, but the terminals have to wake up periodically to receive regular beacon transmissions broadcast in the network. In a BSS, the beacon transmissions indicate, for example, whether there are incoming packets buffered for a terminal. If so, the terminal retrieves the packets, goes back to sleep, and wakes up again to listen to the next beacon transmission.

In an ad-hoc network (IBSS), where no access points exist, one of the wireless terminals assumes the responsibility of sending the beacon frame. The beacon interval of the ad-hoc network is set by the terminal that instantiates the ad-hoc network. This terminal initiates a series of Target Beacon Transmission Times (TBTTs). At each TBTT, each terminal calculates a random time delay and then broadcasts a beacon frame if no other terminal does so before that. The purpose of the random time delay is to circulate the beacon broadcast responsibility among the terminals of the ad-hoc network.

After each TBTT, an ATIM (Announcement Traffic announcement message) window follows, during which only beacon frames and ATIM frames can be sent. ATIM frames are sent by terminals that have buffered frames for the terminals that are in power save mode, and an ATIM frame thus indicates to a terminal that buffered data waits to be delivered to the said terminal. An ATIM frame is either sent directly to one terminal or multicast/broadcast to several terminals. A dedicated ATIM frame has to be acknowledged by the receiving terminal. All the terminals have to be awake during the ATIM window, and if a terminal receives an ATIM frame, it has to be awake for the next beacon interval. A terminal may receive multiple ATIM frames from several other terminals, and it has to acknowledge each dedicated ATIM frame received. If a terminal has buffered data for several other terminals, it has to send a dedicated ATIM frame to each of said terminals. For sending each ATIM frame or acknowledgment, the terminal has to contend with other terminals for access to the channel.

In an ad-hoc network, the terminal that instantiates the network decides on whether power saving is used in the network. If the power saving is not used, the value of the ATIM window is set to zero.

A drawback that relates to the above-described operation of an IBSS is that the proportion of the time during which the terminals have to be awake is relatively high. In other words, the total time that the terminals of an ad-hoc network have to be awake just as a precaution in case they should have to perform some transmission/reception functions is rather high. Furthermore, it is inefficient that in case of several terminals having buffered data for the same terminal, several ATIM frames have to be sent. This all causes a lot of overhead in terms of power consumption and shortens the life of the terminal batteries.

The present invention seeks to accomplish a solution by means of which the above drawbacks in the operation of an IBSS can be alleviated.

SUMMARY OF THE INVENTION

The present invention seeks to devise a new mechanism for improving the efficiency of a beacon-based, short-range wireless ad-hoc network in terms of power consumption.

In the present invention, the terminal that instantiates the network and establishes the beacon interval starts as a beacon broadcaster. A list of the identifiers of the terminals belonging to the network is broadcast in the beacon frame. Consequently, if the beacon broadcaster is to be changed, every terminal knows, based on the list, which of the terminals will be the next beacon broadcaster, without having to contend with the other terminals for the broadcasting responsibility. The identifiers may be, for example, the MAC addresses of the terminals.

According to one embodiment of the invention, a method for broadcasting beacon frames in a short-range wireless ad-hoc network comprises the steps of establishing a beacon interval for the ad-hoc network, where the beacon interval is established in a first wireless terminal, and broadcasting beacon frames from the first wireless terminal at the beacon intervals, whereby the first wireless terminal starts to act as a beacon broadcaster in the ad-hoc network and one wireless terminal at a time acts as the beacon broadcaster during normal operation of the ad-hoc network. The method also includes introducing an identifier list into at least some of the beacon frames, the identifier list including identifiers of wireless terminals belonging to the ad-hoc network.

In one embodiment of the invention, the terminals transmit modified ATIM frames to the beacon broadcaster, which then broadcasts the traffic information carried by said frames in the beacon frame. Thus, instead of sending ATIM frames to each other, the terminals send modified ATIM frames to the beacon broadcaster, which broadcasts the collected information. The ATIM frames are modified by inserting a new field therein, which indicates the terminal(s) for which buffered data exists. In this way, the overhead caused by the receiving of the ATIM frames and sending of the acknowledgments is removed. Furthermore, the listening time of the terminals that are in power save mode and the transmission time of the terminals buffering data to several other terminals is further reduced. Consequently, in addition to the beacon contention period, also the ATIM window may be removed in an IBSS of the invention. The modified ATIM frames are in this context also termed as traffic announcement messages.

In one embodiment of the invention, the terminal that starts the broadcasting of the beacon frames continues as the beacon broadcaster unless the said terminal disappears from the network. In this embodiment, the beacon generation is thus totally centralized, as opposed to the distributed generation in the conventional ad-hoc networks.

In another embodiment of the invention, the centralized mode is combined with the distributed mode to form a "semi-centralized" mode, in which the beacon broadcasting terminal is changed after every N (N>1) beacon frames. When N becomes infinite, this mode converts to the centralized mode. The identifier list may be used for selecting a new broadcaster in the "semi-centralized" mode, or selecting a new broadcaster if the current broadcaster disappears from the network.

In a further aspect the invention provides a wireless terminal for a wireless short-range ad-hoc network. The wireless terminal comprises beacon broadcasting means for broadcasting beacon frames at beacon intervals in the ad-hoc network. The beacon broadcasting means are configured to insert an identifier list in at least some of the beacon frames, the identifier list including identifiers of wireless terminals belonging to the ad-hoc network. At least some terminals are provided with control means for deciding, based on the identifier list, whether the wireless terminal is to be selected as a beacon broadcaster in the ad-hoc network.

Other features and advantages of the invention will become apparent through reference to the following detailed description and accompanying drawings.

BRIEF DESCRIPTION OF THE DRAWINGS

In the following, the invention and many of its embodiments are described more closely with reference to the examples shown in FIGS. 1 to 10 in the appended drawings, wherein:

FIG. 6 illustrates the body of a beacon frame broadcast in an IBSS of the invention;

FIG. 9 illustrates another embodiment of the terminal identifier list carried in the beacon frame; and FIG. 10 is a block diagram illustrating the basic elements of the terminal according to one embodiment of the invention.

DETAILED DESCRIPTION OF THE INVENTION

Figure 1:
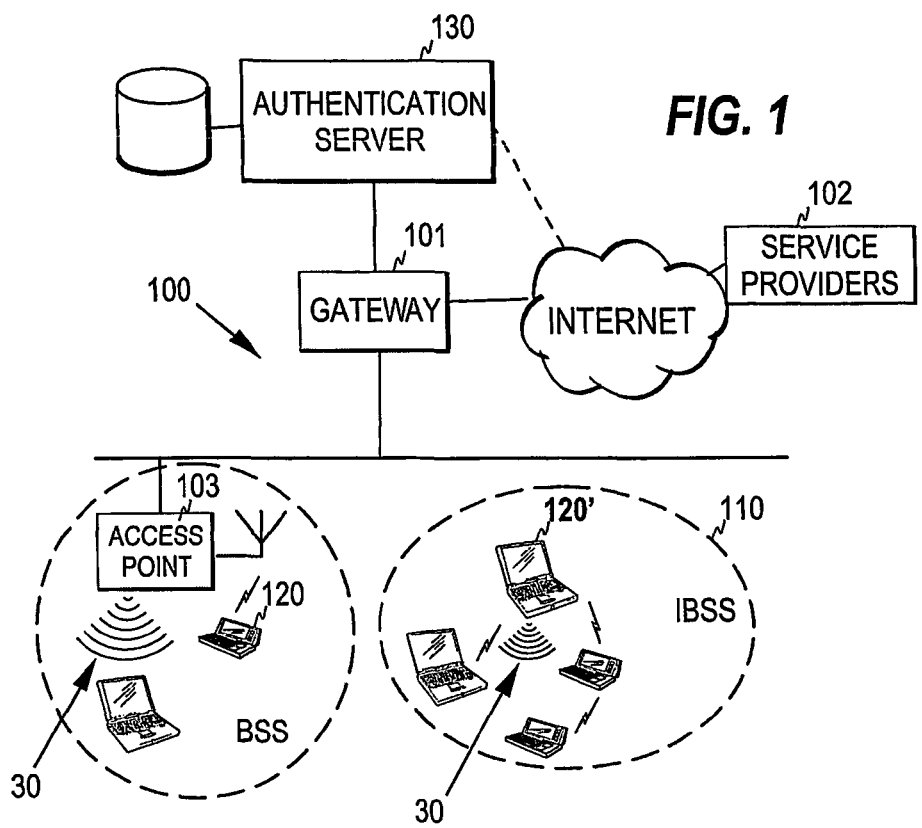
FIG. 1 illustrates an example of a communication environment including an ad-hoc network according to the invention.

FIG. 1 illustrates a typical WLAN communication system. The system includes one or more WLAN networks 100, each connected by means of a gateway 101 (a router) to another network, such as the Internet, which contains service providers 102. Each WLAN network comprises one or more access points 103, each communicating wirelessly with the terminals within the coverage area, i.e. the cell, of the access point and thus forming a bridge between the terminals and the wired network.

As mentioned above, in an infrastructure network an access point and at least one terminal is said to form a Basic Serving Set (BSS). A series of BSSs then forms an Extended Service Set (ESS). These BSSs are connected to each other by a Distribution System (DS), which can be a wired network, such as an Ethernet LAN, within which TCP/IP packets are transmitted, or a wireless network, or a combination of these two. However, the basic type of an IEEE 802.11 LAN is an Independent BSS (IBSS), which consists of two or more terminals. The terminals of an IBSS form an ad-hoc network 110.

The terminals of the invention are short-range wireless communication terminals, preferably based on the IEEE 802.11 standards for wireless local area networking. The terminals may be portable computers, PDA equipment, intelligent phones or other such mobile terminals 120. In the same way as an ordinary GSM telephone, the terminals can be made up of two parts: the actual subscriber device, e.g. a portable computer (with software), and a SIM (Subscriber Identity Module), whereby from the viewpoint of the network the subscriber device becomes a functioning terminal only when the SIM has been inserted into it. The SIM may be a subscriber identity module for use in the GSM (Global System of Mobile communications) network or in the UMTS (Universal Mobile Telecommunication System), for example. In the latter case it is termed a USIM (Universal Services Identity Module). However, the terminals may equally well be traditional WLAN terminals in which no SIM is used.

The system further typically contains an authentication server 130 of the WLAN network. The authentication server is connected to the above-mentioned gateway through a secured connection, which is typically a TCP/IP connection established through an operator network or through the Internet. As discussed below, in an infrastructure network the access points broadcast beacon messages 30, while in an ad-hoc network the terminals share this responsibility. In FIG. 1, the terminal that acts as the current broadcaster of the beacon frame in the IBSS is marked with reference numeral 120'.

As the present invention does not relate to the architecture of the WLAN system, it is not discussed in more detail here.

Figure 2:
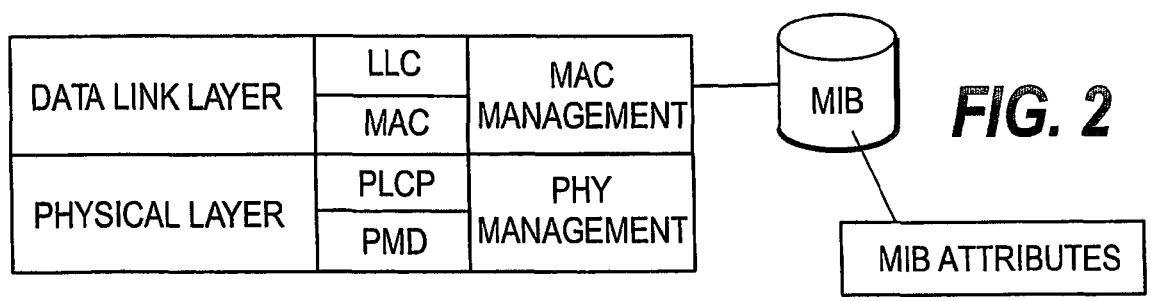
FIG. 2 illustrates the MAC entity utilized in the present invention.

The IEEE standard 802.11 defines the physical layer options and the MAC (Media Access Control) layer protocol for the wireless LAN. FIG. 2 illustrates the protocol architecture of the IEEE 802.11 standard. As shown in the figure, the actual MAC protocol operates in the lower sub-layer of the second layer of the OSI layer model, which is the Data Link Layer (DLL). The MAC management layer supports the association and roaming functionalities and it further controls the power saving functions, the authentication and encryption mechanisms, and synchronization of the terminals, for example. The MAC management layer further maintains a MAC layer management database, i.e. the MIB (Management Information Base) of the MAC layer. The MAC layer cooperates with the physical management layer to maintain the database.

The physical layer is divided into two sub-layers, which are the PLCP (Physical Layer Convergence Protocol) sub-layer and the PMD (Physical Medium Dependent) sub-layer. The purpose of the PLCP is to provide minimum dependence on the PMD in order to simplify the interface between the physical layer and the MAC layer.

Figure 3:
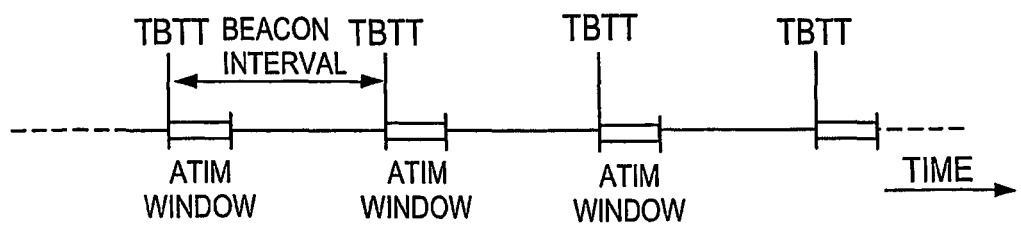
FIG. 3 illustrates the ATIM windows used in a conventional BSS.

As is known, in WLAN networks beacon frames are broadcast periodically to enable the terminals to establish and maintain communications in an orderly fashion. FIG. 3 is a time line illustrating the use of ATIM windows in a conventional IBSS. As mentioned above, the terminal that instantiates the IBSS, determines a series of Target Beacon Transmission Times (TBTTs) by determining the number of time units (TUs) between two successive TBTTs. Each TBTT is followed by an ATIM window during which only beacon or ATIM frames shall be transmitted (beacons are not shown in the figure). At each TBTT, each terminal calculates a random time delay and then broadcasts a beacon frame if no other terminal does so before that.

In the present invention, the terminal that instantiates the network and establishes the beacon interval starts as the beacon broadcaster. A list of the identifiers of the terminals belonging to the network is broadcast in the beacon frame so that if/when the beacon broadcaster is to be changed, every terminal knows, based on the list, which of the terminals will be the next beacon broadcaster, without having to contend with the other terminals for the broadcasting responsibility. In one embodiment of the invention, the beacon broadcaster is changed only if the terminal that instantiated the network disappears from the network, in which case a new beacon broadcaster has to be selected. In another embodiment of the invention, the above "centralized" mode is combined with the conventional distributed mode to form a "semi-centralized" mode, in which the beacon broadcasting terminal is changed after every N (N>1) beacon intervals. In this embodiment, the beacon broadcasting turns are thus circulated slowly. As discussed below, the moment when the beacon broadcaster changes can be given in the beacon frame.

The terminal identifier list broadcast in the beacon frame may be used to determine the next beacon broadcasting terminal regardless of whether the change is an expected one, or caused by an unexpected disappearance of the current beacon broadcaster from the network. When compiling the terminal identifier list, the beacon broadcaster may arrange the terminal identifiers so that their order directly indicates the order in which the terminals assume the beacon broadcasting responsibility. Various criteria, such as the terminal type, may be used for determining the order.

Figure 4:
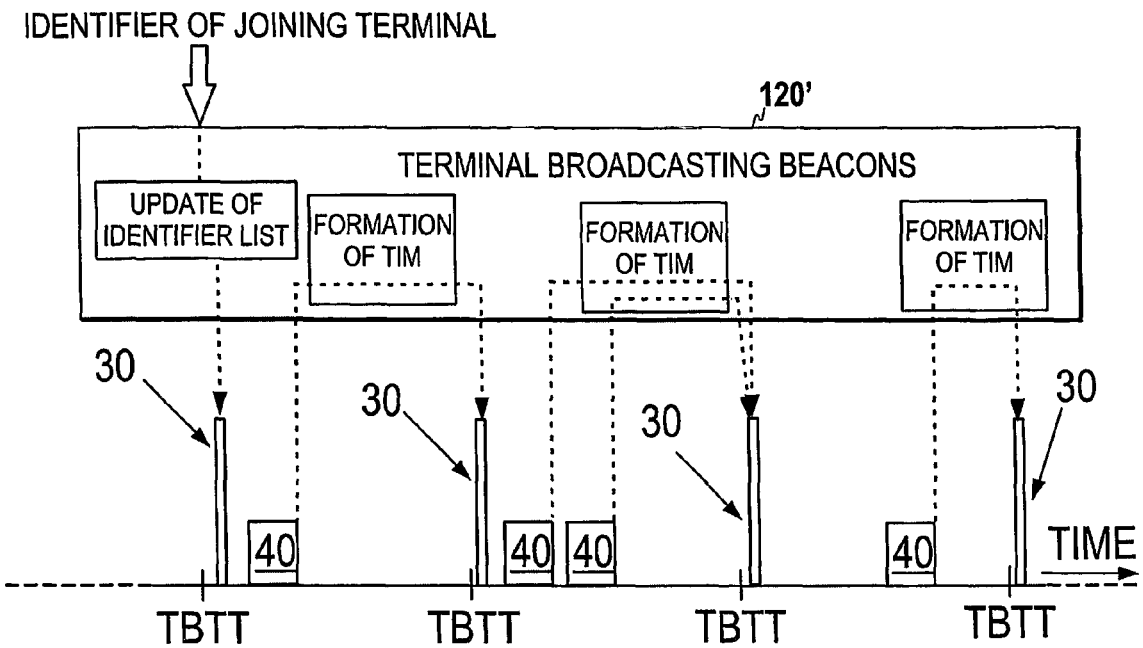
FIG. 4 illustrates the operation of one embodiment of an IBSS of the invention.

FIG. 4 illustrates the operation of an IBSS according to one embodiment of the invention. The upper part of the figure shows the terminal that acts as the beacon broadcaster, while the lower part of the figure shows a time line that illustrates the operation of the network. As discussed above, in the present invention a terminal identifier list is introduced in the IBSS beacon frame, and the terminal broadcasting the beacon frames maintains the list. For this purpose, a mechanism is introduced into the system, by means of which the beacon broadcaster may collect the identifiers of the terminals. A basic negotiation process is enough for this purpose. For example, a negotiation similar to the association negotiation used in a BSS may be utilized for transferring the terminal identifier to the beacon broadcaster. When a terminal joins the network, the terminal acting as the beacon broadcaster, i.e. terminal 120', thus obtains the identifier of the joining terminal. Terminal 120' then updates the current identifier list and inserts the updated list into the next beacon frame 30.

Each ad-hoc terminal that has buffered data for at least one other terminal sends a modified ATIM frame 40 to the beacon broadcaster. In the modified ATIM frame the terminal indicates the terminal to which data is to be delivered. Based on the modified ATIM frames received from the terminals, the beacon broadcaster compiles a TIM element and introduces it, in one embodiment of the invention, into the next beacon frame. Transmitting terminals postpone the transmission to the next beacon interval. Receiving terminals may stay awake the whole beacon interval and also receive the next beacon frame, in order to check whether there is more data for the terminal. This requires that the beacons are generated by the same terminal at least as long as there are pending ATIMs. As described below, it is not necessary to introduce the TIM element to every beacon frame, but the information carried by the TIM element can be broadcast less frequently. This enables the terminals to sleep over several beacon intervals.

As a result of the above IBSS operation, a ATIM window is no longer needed in the IBSS. Therefore, the modified ATIM frames may be transmitted during the whole beacon interval. Furthermore, the burden of sending ATIM acknowledgments is eliminated.

Figure 5:
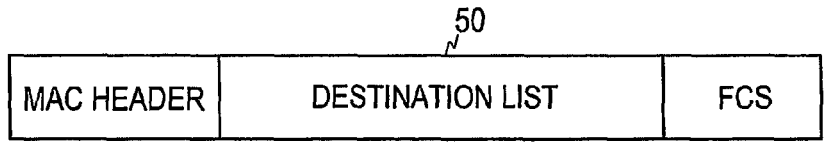
FIG. 5 illustrates the format of a traffic announcement message of the invention.

FIG. 5 illustrates one embodiment of a modified ATIM frame. According to the current IEEE 802.11 standard, the frame body of the ATIM frame is null, i.e. no data is carried in the frame body. In the modified ATIM frame of the invention, the frame body 50 contains a destination list, which includes the identifier(s) of the terminals for which buffered data exists, The destination list may be implemented in various forms. In one embodiment, the destination list utilizes the same identifiers, i.e. MAC addresses, as are used in the terminal identifier list in the beacon frame. In another embodiment, the destination list is implemented as a bitmap field where bit number i corresponds to a terminal with the same index in the identifier list. The bitmap thus includes as many bits as there are terminals in the identifier list, with the value of the bit indicating whether there is data buffered for the corresponding terminal. The MAC header and the Frame Check Sequence (FCS) field of the ATIM frame are used in a conventional manner.

FIG. 6 illustrates the information elements that may, in one embodiment of the invention, be in the body of the beacon frame. The beacon frame structure of the invention corresponds to the known beacon frame sent in an IBSS, with the exception of the modifications discussed below. Firstly, a TIM information element is introduced into the beacon frame. In the invention, a TIM element similar to the one used in a BSS is thus inserted as a new information element to the beacon frame of an IBSS, but in a modified form as compared to the TIM element used in a BSS. As illustrated above, the modified TIM element is compiled by the beacon broadcaster from the modified ATIM frames received during at least one previous beacon interval. Secondly, the terminal identifier list is inserted into the beacon frame as the last element of the frame body. It is to be noted here that all the information elements shown in FIG. 5 are not always present. The terminal identifier list is preferably in each beacon frame, but may also be broadcast less frequently.

A further modification of the body of the beacon frame concerns the IBSS Parameter Set. As indicated above, the moment of change of the beacon-broadcasting terminal may be indicated in the beacon frame, if the "semi-centralized" mode is used. Since the IBSS does not any more have the ATIM window, the ATIM Window length carried in the IBSS Parameter Set may be replaced by a value that indicates when the next change of beacon broadcaster will be.

The other information elements of the beacon frame body may be used according to the IEEE 802.11 standard.

Figure 7:
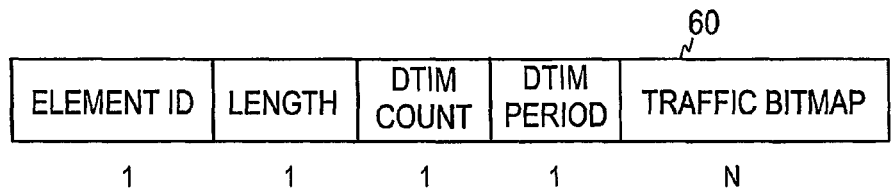
FIG. 7 illustrates a traffic indication data element carried in the beacon frame.

FIG. 7 illustrates one embodiment of the TIM element used in the beacon frame. The lengths in octets of the element fields are shown below the element. In this embodiment, the TIM corresponds to the TIM used in a BSS, except that the two last fields of a BSS TIM (Bitmap Control and Partial Virtual Bitmap) have been replaced by a single field 60, which is in this context termed Traffic Bitmap. The Traffic Bitmap is a bitmap of n octets such that bit number M (out of 8×n bits) corresponds to a terminal with the same index (i.e. M) in the identifier list. To give an example, if the traffic map is one byte long and its content is 00100001, the terminals that are the first and sixth ones in the identifier list, should wake up to receive data. If a terminal detects that the bit corresponding to it is set to one, it should keep awake during the following beacon period for receiving data from one of the other terminals. The DTIM count and the DTIM Period fields are similar to and may be used similarly as the corresponding fields in a BSS TIM.

It is to be noted here that in FIG. 4 it is assumed that the terminals wake up for each beacon and that in each beacon there is a Traffic Bitmap in the TIM element, thereby allowing the terminal to check whether there is incoming data for the terminal during the next beacon interval. However, as the DTIM periodicity effects the wake up times of the terminals being in the power save state, the DTIM periodicity may be used, as in a BSS, to put the terminals in the power save state for several beacon intervals. In other words, the DTIM periodicity can be utilized to indicate when the information carried by the modified ATIM frames can be seen in the beacon frame.

Figure 8:
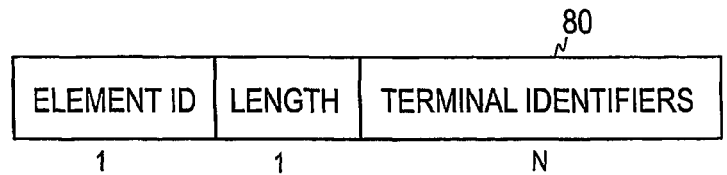
FIG. 8 illustrates one embodiment of the terminal identifier list carried in the beacon frame.

FIG. 8 illustrates one embodiment of the terminal identifier list broadcast in the beacon frame. The first two fields, Element ID and Length, are in accordance with the general information element format defined in the IEEE 802.11 standard. The lengths in octets of the element fields are again shown below the element. These two fields are followed by the terminal identifier list 80. The identity information used in the list may be basically anything that may be used to address the terminals uniquely in the network. In one embodiment of the invention, these identifiers are the MAC addresses of the terminals, and the list contains identifiers of all the terminals currently operating in the ad-hoc network (IBSS). Then this list may be used for address resolution purposes and new terminals joining the network can, after having received the list, start to communicate with any terminal in the network.

In a further embodiment, the terminal identifier list also contains power state information associated with each terminal. This may be implemented, for example, as illustrated in FIG. 9, i.e. by inserting the power state data field 90 after the identifier of the terminal in question. By using the power state information in the terminal identifier list the terminals know if a modified ATIM frame is to be transmitted to the beacon broadcaster. Therefore, the sending of the ATIM frames can be performed only if the terminal really is in the power save state. A terminal may indicate its power state to the beacon broadcaster similarly as in a conventional BSS, i.e. by setting the power management bit in the frame control field of the MAC header.

FIG. 10 illustrates the basic elements of the terminal according to one embodiment of the invention. The mobile terminal 1000 provided with a transceiver 1001 provided with at least one antenna 1002, a control unit 1003, user interface means 1004 for creating a user interface through which the user can operate the terminal, and memory means 1005, which may include one or more smart cards 1006, such as a SIM card. However, as discussed above, a SIM card is not included in a traditional WLAN terminal. The control unit performs the basic functions of the invention, such as the functions related to the beacon broadcasting and to the transmission of the ATIM frames. The memory means include the MAC MIB, which includes the control information needed for the functions, such as the rules for selecting a new beacon broadcaster. For this selection, the MAC MIB also includes the terminal identifier list.

As discussed above, the present invention relates to the operation of the ad-hoc mode. Therefore, the terminals may operate in ad-hoc mode only. Examples of ad-hoc only devices could be various game terminals, payment terminals communicating with vending machines, or electronic notepads, which may exchange files with other terminals. However, the terminals are preferably such that they can be used both in an IBSS and in a BSS. In practice, the terminals are typically multimode terminals intended for both short-range wireless systems and for long-range wireless systems (i.e. mobile networks). The wireless terminals may also operate differently from each other. For example, the terminal starting as the beacon broadcaster does not necessarily have the control means for deciding, based on the identifier list, whether the said terminal is to be selected as the beacon broadcaster. It is also possible that once the terminal has acted as a beacon broadcaster, it cannot anymore assume this responsibility. Therefore, the identifier list does not necessarily include the identifiers of all the terminals belonging to the ad-hoc network.

Although the invention was described above with reference to the examples shown in the appended drawings, it is obvious that the invention is not limited to these, but may be modified by those skilled in the art without departing from the scope and spirit of the invention. Thus, although the invention was illustrated above with the help of the IEEE 802.11 standard, the invention may also be used in connection with any similar beacon-based ad-hoc system.

The invention claimed is:

1. An apparatus, comprising:
   a receiver configured to receive beacon frames at beacon intervals, at least some of the beacon frames including an identifier list including identifiers of terminals belonging to an ad-hoc network;

a controller configured to decide, based on the identifier list, whether a wireless terminal is to be selected as a beacon broadcaster in the ad-hoc network; and a transmitter, responsive to the controller, configured to broadcast beacon frames in the ad-hoc network, the transmitter being configured to insert the identifier list in at least some of the beacon frames broadcast by the wireless terminal.

2. The apparatus according to claim 1, wherein the transmitter is configured to send at least one traffic announcement message to another wireless terminal, wherein said at least one traffic announcement message identifies at least one wireless terminal for which the wireless terminal has data to be delivered, and wherein said another wireless terminal is the beacon broadcaster in the ad-hoc network.

3. The apparatus according to claim 1, wherein the transmitter is configured to transmit an identifier of the wireless terminal to another wireless terminal acting as the beacon broadcaster in the ad-hoc network.

4. The apparatus according to claim 1, wherein the identifier list includes media access control addresses of the wireless terminals belonging to the ad-hoc network.

5. A method comprising:

receiving beacon frames at beacon intervals, at least some of the beacon frames including an identifier list including identifiers of terminals belonging to an ad-hoc network;

deciding, based on the identifier list, whether a wireless terminal is to be selected as a beacon broadcaster in the ad-hoc network;

responsive to the deciding, broadcasting beacon frames in the ad-hoc network; and inserting the identifier list in at least some of the beacon frames broadcast by the wireless terminal.

6. The method according to claim 5, further comprising sending at least one traffic announcement message to another wireless terminal, wherein said at least one traffic announcement message identifies at least one wireless terminal for which the wireless terminal has data to be delivered, and wherein said another wireless terminal is the beacon broadcaster in the ad-hoc network.

7. The method according to claim 5, further comprising:

receiving and handling at least one traffic announcement message identifying at least one wireless terminal for which data is to be delivered in the ad-hoc network;

compiling, based on the at least one traffic announcement message, a traffic indication data element; and inserting the traffic indication data element into a selected subsequent beacon frame.

8. The method according to claim 5, further comprising transmitting an identifier of the wireless terminal to another wireless terminal acting as the beacon broadcaster in the ad-hoc network.

* * * * *